(12) United States Patent
Hisatsugu et al.

(10) Patent No.: US 9,864,439 B2
(45) Date of Patent: Jan. 9, 2018

(54) INPUT DEVICE

(71) Applicant: DENSO CORPORATION, Kariya, Aichi-pref. (JP)

(72) Inventors: Shinsuke Hisatsugu, Kariya (JP); Shinji Hatanaka, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 202 days.

(21) Appl. No.: 14/900,974

(22) PCT Filed: Jun. 24, 2014

(86) PCT No.: PCT/JP2014/003374
§ 371 (c)(1),
(2) Date: Dec. 22, 2015

(87) PCT Pub. No.: WO2014/208078
PCT Pub. Date: Dec. 31, 2014

(65) Prior Publication Data
US 2017/0300135 A1    Oct. 19, 2017

(30) Foreign Application Priority Data

Jun. 26, 2013 (JP) ................................. 2013-134024

(51) Int. Cl.
*G06F 3/0354* (2013.01)
*H02K 41/035* (2006.01)

(52) U.S. Cl.
CPC ....... *G06F 3/0354* (2013.01); *H02K 41/0356* (2013.01)

(58) Field of Classification Search
CPC .......................... G06F 3/0354; H02K 41/0356
See application file for complete search history.

(56) References Cited

U.S. PATENT DOCUMENTS 6,839,050 B2 * 1/2005 Sakamaki ............... B60K 37/06
345/156
7,336,006 B2 * 2/2008 Watanabe ............... G06F 3/016
310/12.25
(Continued)

FOREIGN PATENT DOCUMENTS

JP    2000014117 A    1/2000
JP    2000306724 A    11/2000
(Continued)

OTHER PUBLICATIONS

International Search Report and Written Opinion (in Japanese with English Translation) for PCT/JP2014/003374, dated Sep. 9, 2014; ISA/JP.

*Primary Examiner* — Andrew Sasinowski
(74) *Attorney, Agent, or Firm* — Harness, Dickey & Pierce, P.L.C.

(57) ABSTRACT

Provided is an input device that can reduce a magnetic attractive force generated between a coil-side yoke and magnets while suppressing the decrease in an operation reaction force that can be generated. The input device includes four coils arranged in a cross shape and a magnet assembly. When a current is applied to windings of the coils, electromagnetic forces are generated between the coils and the magnet assembly. In addition, the input device includes a coil-side yoke that is located opposite to the magnet assembly across the coils. The coil-side yoke is shaped so that magnetic fluxes generated by the magnet assembly are concentrated on winding portions of the windings of the coils, the winding portions being arranged along directions of a cross.

4 Claims, 8 Drawing Sheets

(56) References Cited

U.S. PATENT DOCUMENTS

| | | | |
|---|---|---|---|
| 7,436,396 B2* | 10/2008 | Akieda | G06F 3/016 345/156 |
| 8,988,351 B2* | 3/2015 | Okada | G06F 3/0338 345/156 |
| 9,298,259 B2* | 3/2016 | Wiertlewski | G06F 3/015 |
| 2004/0056745 A1 | 3/2004 | Watanabe et al. | |
| 2004/0059245 A1 | 3/2004 | Watanabe et al. | |
| 2005/0179649 A1 | 8/2005 | Fujii et al. | |
| 2011/0043447 A1 | 2/2011 | Inaba et al. | |

FOREIGN PATENT DOCUMENTS

| | | |
|---|---|---|
| JP | 2003059020 A | 2/2003 |
| JP | 2003189579 A | 7/2003 |
| JP | 2005234616 A | 9/2005 |
| JP | 3997872 B2 | 10/2007 |
| JP | 2007293944 A | 11/2007 |
| JP | 2011044005 A | 3/2011 |
| WO | WO-2014174793 A1 | 10/2014 |
| WO | WO-2014181505 A1 | 11/2014 |

* cited by examiner

INPUT DEVICE

CROSS REFERENCE TO RELATED APPLICATIONS

This application is a U.S. National Phase Application under 35 U.S.C. 371 of International Application No. PCT/JP2014/003374 filed on Jun. 24, 2014 and published in Japanese as WO 2014/208078 A1 on Dec. 31, 2014. This application is based on and claims the benefit of priority from Japanese Patent Application No. 2013-134024 filed on Jun. 26, 2013. The entire disclosures of all of the above applications are incorporated herein by reference.

This application is based on Japanese Patent Application No. 2013-134024 filed on Jun. 26, 2013, the disclosure of which is incorporated herein by reference.

TECHNICAL FIELD

The present disclosure relates to an input device.

BACKGROUND ART

In the past, for example, Patent Literature 1 has disclosed a structure as an actuator for use in an input device, which includes magnets supported by a first yoke board and coils supported by a second yoke board. In this structure, the second yoke board is provided in a manner to be movable relative to the first yoke board and fixed on a tactile presentation member to which an input is made by user operation. Therefore, the electromagnetic force generated between a coil and a magnet acts on the tactile presentation member as an operation reaction force.

In addition, the above second yoke board is located opposite to the magnets across the coils so that the magnetic fluxes generated by the magnets are guided toward the coils. According to this magnetic flux guiding function of the second yoke board, a magnetic field with a high magnetic flux density can be generated in the area between the first and second yoke boards where the coils are disposed. Thus, it is easy to obtain an electromagnetic force that can be generated between a magnet and a coil.

PRIOR ART LITERATURE

Patent Literature

Patent Literature 1: Japanese Patent No. 3997872 Gazette

SUMMARY OF INVENTION

In order to increase the electromagnetic force that can be generated between a magnet and a coil, the present inventors have made a lot of improvements, including the use of a magnet with a higher magnetic flux density and the adoption of a structure with coils sandwiched between magnets and a yoke, to increase the magnetic flux density in the reaction force generating part of the coil. However, in the structure disclosed in the Patent Literature 1, the area in which the second yoke board and the magnets face each other is wide and thus the magnetic attractive force generated between the second yoke board and magnets is very strong. Since such magnetic attractive force may worsen the operation feeling of the input device, it is desirable to reduce it. However, it has been difficult to reduce the magnetic attractive force while obtaining an operation reaction force that can be generated between the magnet and coil.

The present disclosure has been made in view of the above drawback and an object thereof is to provide an input device that can reduce a magnetic attractive force while suppressing the decrease in an operation reaction force that can be generated.

The present inventors have focused attention on the fact that the decrease in an operation reaction force that can be generated can be suppressed if the density of magnetic fluxes passing through an effective winding portion of a winding that generates an operation reaction force is ensured.

According to an aspect of the present disclosure, an input device includes: four coils that have windings wound around and to be supplied with current and are arranged in a cross shape; a magnetic flux generating part that has an opposed surface facing the four coils in a direction along winding axes about which the windings are wound and is located in a manner to be movable relative to the four coils along a plane facing the four coils by electromagnetic forces generated between the magnetic flux generating part and the windings supplied with current; and a magnetic yoke that is located opposite to the magnetic flux generating part across the four coils and concentrates magnetic fluxes generated by the magnetic flux generating part on portions of the windings of the four coils disposed in directions along a cross.

In this structure, the magnetic yoke located opposite to the magnetic flux generating part across the coils concentrates the magnetic fluxes generated by the magnetic flux generating part on the windings of the coils arranged along the directions along the cross. Consequently, the decrease in the density of magnetic fluxes passing through the windings of each coil arranged along the directions along the cross is suppressed, so the decrease in the electromagnetic force as an operation reactive force that can be generated between the magnetic flux generating part and the coils is suppressed. In addition, the portion of the yoke that cannot perform the function to concentrate magnetic fluxes on the windings arranged along the directions along the cross can be reduced. When the area of the magnetic yoke is decreased based on this concept, the magnetic attractive force generated between the magnetic flux generating part and the magnetic yoke can be reduced.

Therefore, it is possible to reduce the magnetic attractive force generated between the magnetic flux generating part and the magnetic yoke while suppressing the decrease in an operation reactive force that can be generated between the magnetic flux generating part and the coils.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
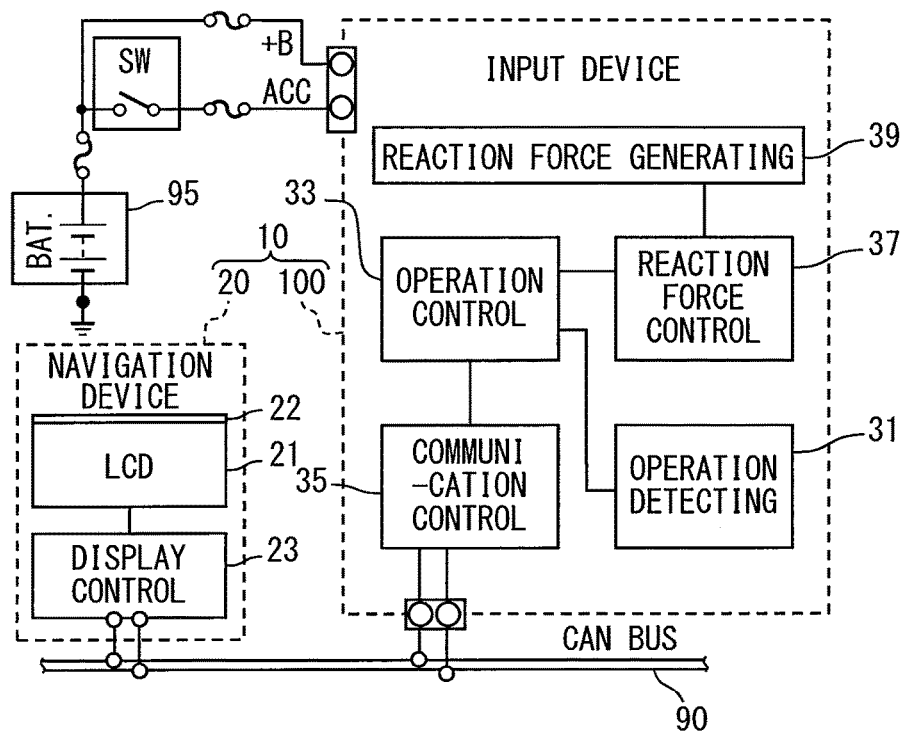
FIG. 1 is a diagram for explaining the structure of a display system with an input device according to an embodiment of the present disclosure.

Next, an embodiment of the present disclosure will be described referring to the drawings.

Figure 2:
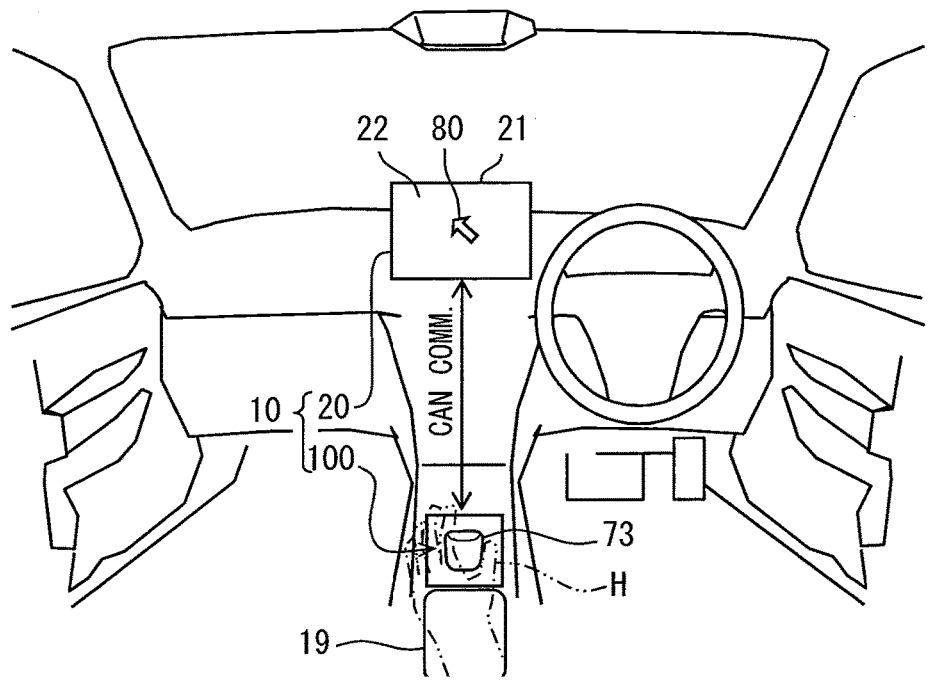
FIG. 2 is a diagram for explaining the location of the input device in a vehicle.

An input device 100 according to an embodiment of the present disclosure is mounted in a vehicle and constitutes a display system 100 along with a navigation device 20, etc. as shown in FIG. 1. As shown in FIG. 2, the input device 100 is installed in a position adjacent to a palm rest 19 on the center console of the vehicle while an operation knob 73 is exposed in a manner to be easily accessible by an operator's hand. When an operation force is inputted by hand H of the operator, this operation knob 73 is displaced in the direction of the input operation force.

The navigation device 20 is installed in the instrument panel of the vehicle with a display screen 22 exposed towards the driver seat. A plurality of icons associated with given functions, a pointer 80 to select a desired icon and so on are shown on the display screen 22. As a horizontal operation force is inputted to the operation knob 73, the pointer 80 moves on the display screen 22 in the direction corresponding to the operation force input direction. The navigation device 20 is connected with Controller Area Network (CAN) bus 90 as shown in FIGS. 1 and 2 and can make CAN communications with the input device 100, etc. The navigation device 20 has a display control section 23 that draws images to be displayed on the display screen 22, and a liquid crystal display 21 that continuously displays images drawn by the display control section 23.

Next, the components of the above input device 100 will be each described in detail. As shown in FIG. 1, the input device 100 is connected with the CAN bus 90 and an external battery 95 or the like. The input device 100 can make CAN communications with the navigation device 20, located remotely from it, through the CAN bus 90. The input device 100 is supplied with power required to operate each component, from the battery 95.

The input device 100 is electrically constituted of a communication control section 35, an operation detecting section 31, a reaction force generating section 39, an reaction force control section 37, and an operation control section 33, etc.

The communication control section 35 outputs information processed by the operation control section 33 to the CAN bus 90. Furthermore, the communication control section 35 acquires information outputted from another in-vehicle device to the CAN bus 90 and outputs it to the operation control section 33. The operation detecting section 31 detects the position of the operation knob 73 (see FIG. 2) moved by input of an operation force. The operation detecting section 31 outputs operation information indicating the detected position of the operation knob 73 to the operation control section 33.

The reaction force generating section 39, structured to enable the operation knob 73 to generate an operation reaction force, is an actuator such as a voice coil motor. The reaction force generating section 39 gives a pseudo icon tactile sensation to the operator by applying an operation reaction force to the operation knob 73 (see FIG. 2), for example, when the pointer 80 (see FIG. 2) overlaps an icon on the display screen 22. The reaction force control section 37 includes, for example, a microcomputer etc. to perform various arithmetic operations. The reaction force control section 37 controls the direction and intensity of the operation reaction force applied from the reaction force generating section 39 to the operation knob 73 according to the reaction force information acquired from the operation control section 33.

The operation control section 33 includes, for example, a microcomputer, etc. to perform various arithmetic operations. The operation control section 33 acquires the operation information detected by the operation detecting section 31 and outputs it to the CAN bus 90 through the communication control section 35. In addition, the operation control section 33 calculates the direction and intensity of the operation force to be applied to the operation knob 73 and outputs the result of the calculation as reaction force information to the reaction force control section 37.

Figure 3:
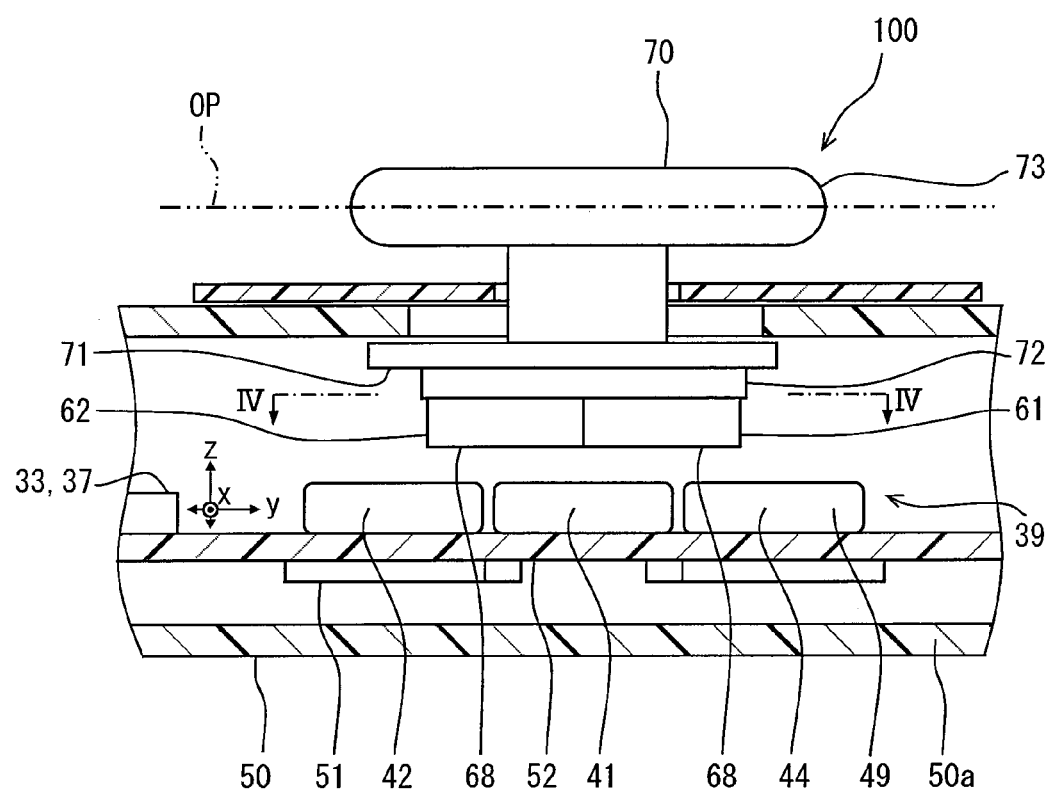
FIG. 3 is a diagram illustrating a schematic sectional view for explaining the mechanical structure of the input device.

The input device 100 is mechanically constituted of a movable part 70 and a fixed part 50 as shown in FIG. 3.

The movable part 70 has a magnet-side yoke 72. Also the movable part 70 is provided with the above operation knob 73. The movable part 70 is located in a manner to be movable relative to the fixed part 50 in an x-axis direction and y-axis direction along a virtual operation plane OP. The ranges in which the movable part 70 can move in the x-axis direction and y-axis direction are predetermined by the fixed part 50. The movable part 70 returns to a reference position as a reference when it is released from the applied operation force.

The fixed part 50 has a housing 50a and a circuit board 52. The housing 50a houses various components including the circuit board 52 and the reaction force generating section 39 while supporting the movable part 70 in a relatively movable manner. The circuit board 52 is fixed in the housing 50a in a manner that its board surface direction is along the operation plane OP. A microcomputer, etc. which constitutes the operation control section 33 and reaction force control section 37 is mounted on the circuit board 52.

Figure 4:
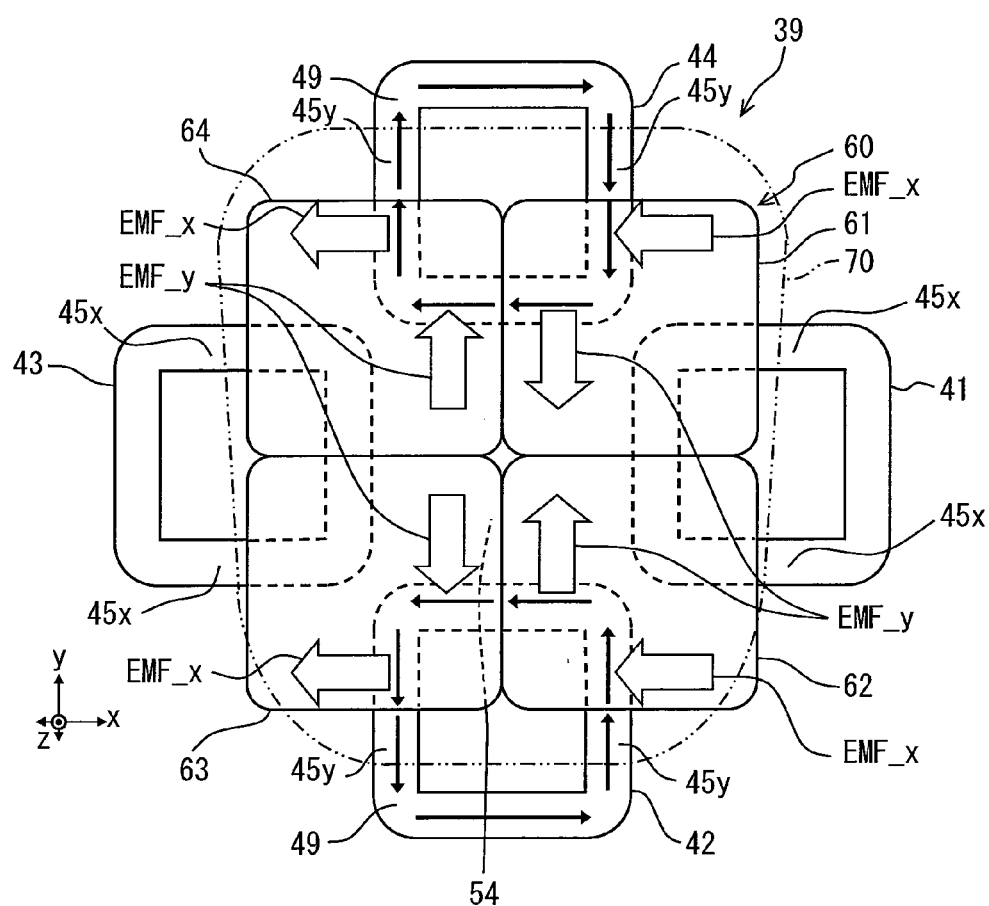
FIG. 4 is a diagram illustrating a sectional view taken along the line IV-IV of FIG. 3, schematically showing the structure of a reaction force generating section.

Next, the structure of the reaction force generating section 39 which is used for reaction force feedback in the input device 100 will be further described referring to FIGS. 3 and 4. The reaction force generating section 39 includes four coils 41 to 44, four magnets 61 to 64, a coil-side yoke 51, and a magnet-side yoke 72.

The coils 41 to 44, which use windings 49 formed by coiling a wire material as a nonmagnetic material such as copper, are almost quadrangular. Each winding 49 is formed by coiling until its thickness becomes tc (for example, 3 mm or so) and electrically connected to the reaction force control section 37. Each winding 49 is supplied with current individually by the reaction force control section 37.

Each of the coils 41 to 44 is mounted on the circuit board 52 with the winding axis of the winding 49 oriented along the z axis perpendicular to the operation plane OP. Due to this arrangement, each of the coils 41 to 44 faces the operation plane OP in the z-axis direction. The cross section of each of the coils 41 to 44 is substantially square. Each of the coils 41 to 44 is supported on the circuit board 52 in a manner that the winding 49 extends along the x-axis direction and y-axis direction.

The four coils 41 to 44 are arranged in a cross shape. More specifically, a pair of coils 41 and 43 are arranged side by side in the x-axis direction with an interval between them. Also, a pair of coils 42 and 44 are arranged side by side in the y-axis direction with an interval between them. This "cross" arrangement along the x-axis direction and y-axis direction forms a center area 54 surrounded on all four sides by the four coils 41 to 44.

Each of the magnets 61 to 64 is a neodymium magnet or the like and has a shape like an almost quadrangular plate. Each of the magnets 61 to 64 is supported on a knob base 71 through the magnet-side yoke 72 with its sides extending along the x-axis or y-axis. The four magnets 61 to 64 are arranged two by two in the x-axis direction and y-axis direction. The four magnets 61 to 64, supported by the magnet-side yoke 72, each have an opposed surface 68 oriented towards the circuit board 52. Each of the magnets 61 to 64 is attached to the circuit board 52 in a manner that a prescribed gap is made between each opposed surface 68 and the end face of each of the coils 41 to 44. Each opposed surface 68 is substantially square and a flat smooth plane. Each opposed surface 68 faces the ends faces of two of the four coils 41 to 44 in the z-axis direction. The polarities of each opposed surface 68, namely two magnetic poles N-pole and S-pole, are alternated in the x-axis direction and y-axis direction.

The coil-side yoke 51 and magnet-side yoke 72 are made of, for example, soft iron or a magnetic material such as magnetic steel sheet. The coil-side yoke 51 is supported on the mounting surface opposite to the mounting surface where the coils 41 to 44 are mounted. The coil-side yoke 51 is located opposite to the magnets 61 to 64 across the coils 41 to 44 and guides magnetic fluxes generated by these magnets 61 to 64 (see the section A of FIG. 7) to the coils 41 to 44. The magnet-side yoke 72 is located between the knob base 71 of the movable part 70 and the magnets 61 to 64. The magnet-side yoke 72 forms a magnetic circuit which guides magnetic fluxes mf generated by the magnets 61 to 64, together with the coil-side yoke 51, thereby restricting leakage of the magnetic fluxes mf to the outside.

Next, the principle on which the reaction force generating section 39 thus structured exerts an operation reaction force on the operation knob 73 will be explained, referring to FIG. 4. In the input device 100, the operation reaction force exerted in the x-axis direction and the operation reaction force exerted in the y-axis direction can be controlled separately. An explanation will be given below by taking as an example a case that an operation reaction force in the x-axis direction is generated when an assembly 60 constituted of four magnets 61 to 64 (hereinafter called the "magnet assembly") is in the reference position together with the operation knob 73.

In order to generate an operation reaction force in the x-axis direction, the coils 42 and 44, arranged side by side in the y-axis direction, are supplied with current by the reaction force control section 37 (see FIG. 1). In a top view as seen in the direction from the magnet-side yoke 72 (see FIG. 3) to the coil-side yoke 51 (see FIG. 3), current flows clockwise in the coil 44. On the other hand, in the coil 42, current flows in an opposite direction to the current flow direction in the coil 44, or counterclockwise.

Due to the above currents, in the winding 49 of the coil 44, electromagnetic force EMF_y in the direction from the coil 44 to the coil 42 along the y axis (hereinafter called "backward") is generated in the portion extending in the x-axis direction and overlapping the magnet 61 in the z-axis direction. Also, in the winding 49 of the coil 44, electromagnetic force EMF_y in the direction from the coil 42 to the coil 44 along the y axis (hereinafter called "forward") is generated in the portion extending in the x-axis direction and overlapping the magnet 64 in the z-axis direction. Similarly, in the winding 49 of the coil 42, forward and backward electromagnetic forces EMF_y are generated in the portions extending in the x-axis direction and overlapping the magnets 62 and 63 in the z-axis direction. These electromagnetic forces EMF_y in the y-axis direction offset each other.

On the other hand, in the winding 49 of the coil 44, electromagnetic forces EMF_x in the direction from the coil 41 to the coil 43 along the x axis (hereinafter called "leftward") are generated in the portions extending in the y-axis direction and overlapping the magnets 61 and 64 in the z-axis direction. Similarly, in the winding 49 of the coil 42, leftward electromagnetic forces EMF_x are generated in the portions extending in the y-axis direction and overlapping the magnets 62 and 63 in the z-axis direction. The reaction force generating section 39 can exert these electromagnetic forces EMF_x on the operation knob 73, as operation reaction forces in the x-axis direction.

Here, in the coils 41 to 44, the portions of the windings 49 along the cross directions in which these coils are arranged are taken as effective winding portions which contribute to generation of operation reaction forces. Specifically, in the two coils 42 and 44 arranged side by side in the y-axis direction, the two sides of each of them which extend in the y-axis direction generate electromagnetic forces EMF_y as operation reaction forces in the x-axis direction. Therefore, in these coils 42 and 44, the two sides of each of them which extend in the y-axis direction are taken as effective winding portions. Similarly, in the two coils 41 and 43 arranged side by side in the x-axis direction, the two sides of each of them which extend in the x-axis direction generate electromagnetic forces EMF_x as operation reaction forces in the y-axis direction. Therefore, in these coils 41 and 43, the two sides of each of them which extend in the x-axis direction are taken as effective winding portions. In the explanation given below, for the sake of convenience, the effective winding portions of the coils 41 and 43 are called first effective winding portions 45$x$ and the effective winding portions of the coils 42 and 44 are called second effective winding portions 45$y$.

Next, the shape of the coil-side yoke 51 will be explained in detail referring to FIGS. 5 and 6.

The coil-side yoke 51 is formed so that the magnetic fluxes mf (see a section A of FIG. 7) generated by the magnets 61 to 64 are concentrated particularly on the effective winding portions 45$x$ and 45$y$ of the windings 49. In order to perform such a function to concentrate the generated magnetic fluxes mf, the coil-side yoke 51 has four first extension portions 51$x$ and four second extension portions 51$y$.

The first extension portions 51$x$ are located opposite to the opposed surfaces 68 across the first effective winding portions 45$x$. The first extension portions 51$x$ extend in the x-axis direction along the first effective winding portions 45$x$. The second extension portions 51$y$ are located opposite to the opposed surfaces 68 across the second effective winding portions 45$y$. The second extension portions 51$y$ extend in the y-axis direction along the second effective winding portions 45y. In the present embodiment, width w of the extension portions 51x and 51y is larger than thickness tc of the windings 49.

The coil-side yoke 51 includes four magnetic members 55. Each magnetic member 55 is formed into an L shape. In a top view, the four magnetic members 55 are attached to the circuit board 52 around the center area 54 in a manner that they are oriented differently at intervals of 90 degrees. In this arrangement, a pair of a first extension portion 51x and a second extension portion 51y which are most adjacent to each other are fixed on the circuit board 52, forming a continuous L shape.

A magnetic field which is generated in the vicinity of the reaction force generating section 39 made up by combination of the coil-side yoke 51 and the magnet assembly 60 will be explained referring to FIG. 7. For comparison with the coil-side yoke 51, FIG. 8 shows a magnetic field in the case that a coil-side yoke 151 with a shape like a flat plate is combined with the magnet assembly 60.

Figure 8:
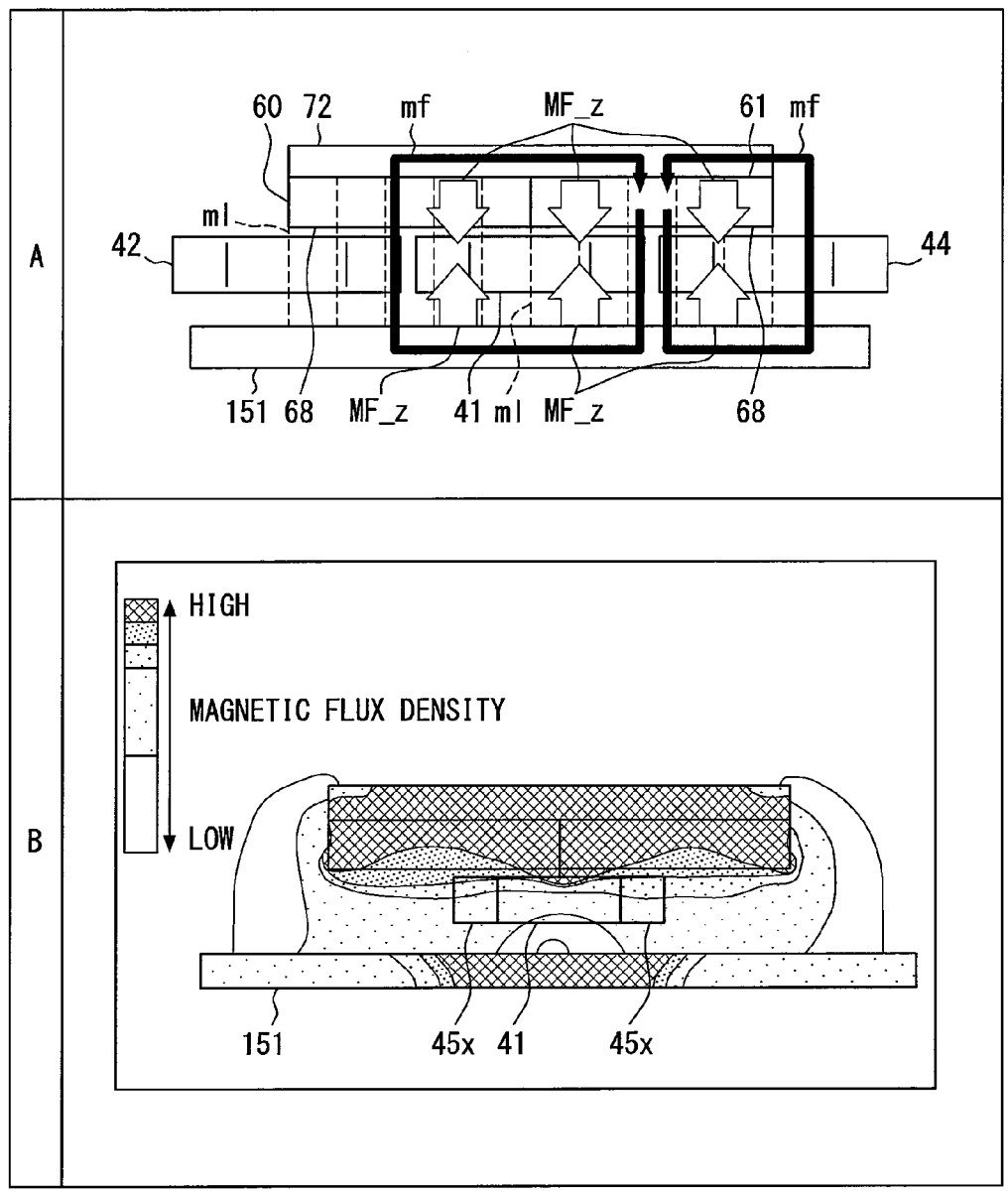
FIG. 8 is a diagram, for comparison with FIG. 7, schematically illustrating magnetic fields generated in the vicinity of the reaction force generating section when the coil-side yoke has a shape like a flat plate.

As shown in a section A of FIG. 8, the whole surface of the coil-side yoke 151 faces the opposed surfaces 68 of the magnet assembly 60. Therefore, a magnetic field is generated like magnetic force lines ml arranged at regular intervals between the coil-side yoke 151 and the magnet-side yoke 72. In a magnetic field like this, the density of magnetic fluxes passing through the first effective winding portions 45x of the coil 41 can be maintained high, as apparent from the simulation result shown in a section B of FIG. 8.

However, as shown in the section A of FIG. 8, the magnetic fluxes mf generated by the magnet 61 disperse in the coil-side yoke 151 and circulate in the coil-side yoke 151 and magnet-side yoke 72 through a plurality of paths before returning to the magnet 61. For this reason, magnetic attractive force MF_z which is generated between the magnet 61 and coil-side yoke 151 is very large. Magnetic attractive force MF_z is generated even when the coils 41 to 44 are supplied with current.

Figure 7:
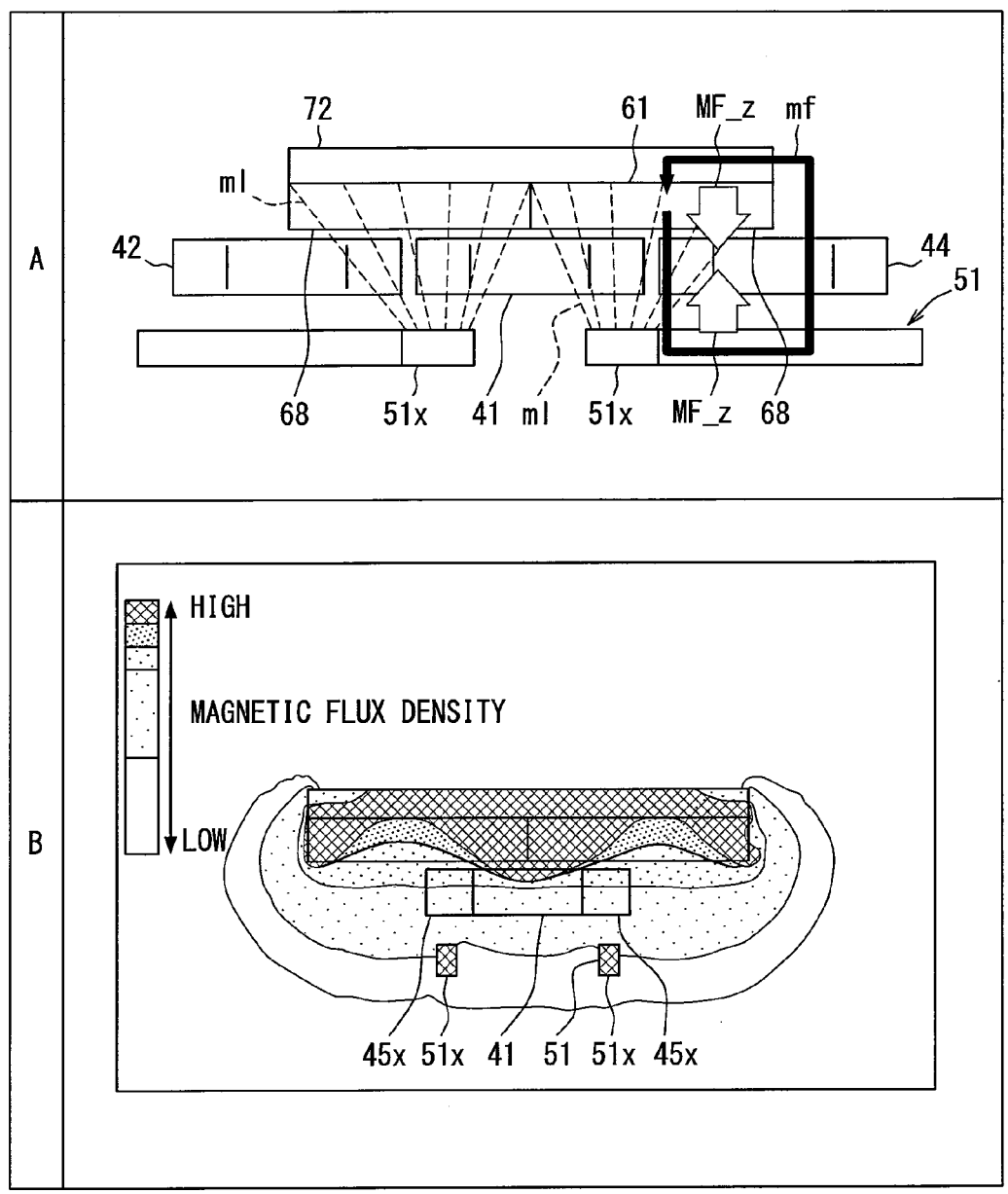
FIG. 7 is a diagram schematically illustrating magnetic fields generated in the vicinity of the reaction force generating section.

In contrast, as shown in the section A of FIG. 7, between the coil-side yoke 51 shaped along cross outlines and the magnet-side yoke 72, a magnetic field is generated in a way that magnetic force lines ml are concentrated on the first extension portions 51x. Even in a magnetic field like this, the density of magnetic fluxes mf passing through the first effective winding portions 45x of the coil 41 can be maintained high, as apparent from the simulation result shown in a section B of FIG. 7.

In addition, as shown in the section A of FIG. 7, the area of the coil-side yoke 51 which faces the opposed surfaces 68 is smaller than that of the flat plate-like coil-side yoke 151 (see the section A of FIG. 8). Therefore, the number of paths through which the magnetic fluxes mf generated by the magnet 61 circulate in the coil-side yoke 51 and magnet-side yoke 72 is smaller. Therefore, the magnetic attractive force MF_z generated between the magnet 61 and the coil-side yoke 51 can be reduced.

Figure 5:
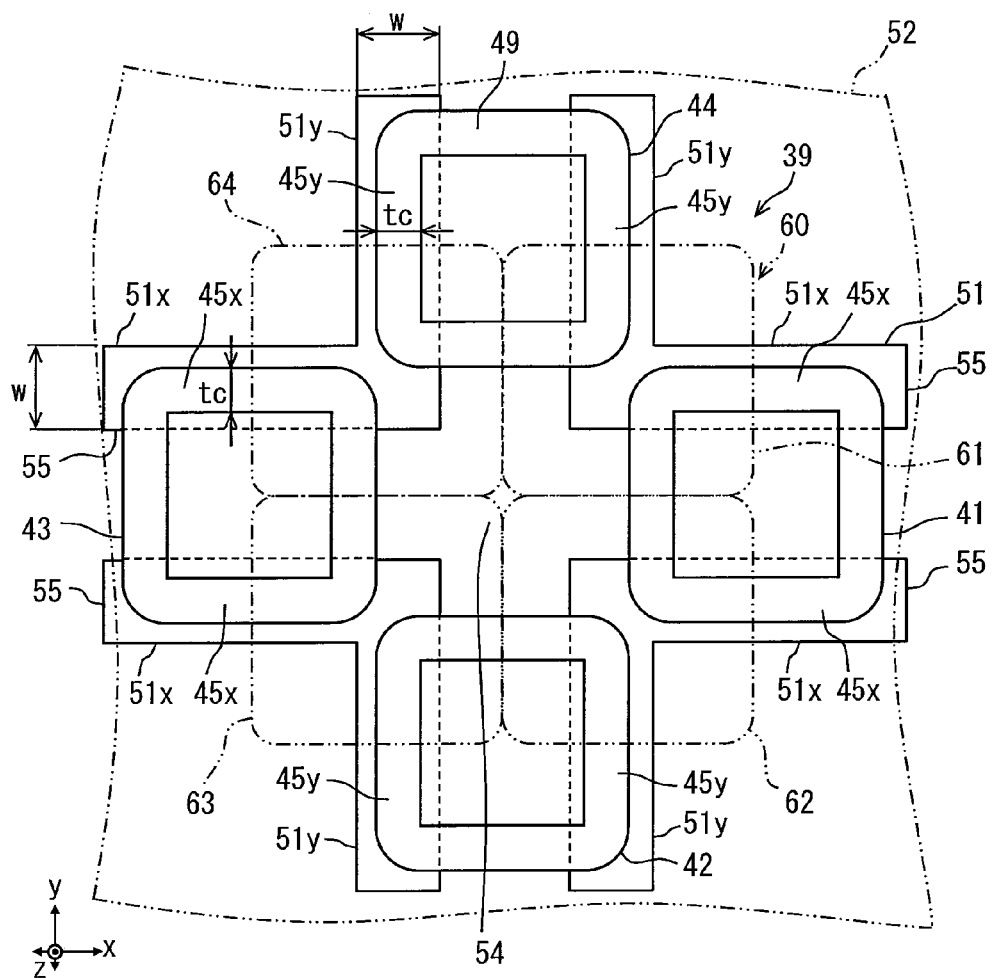
FIG. 5 is a diagram illustrating a plan view of the reaction force generating section for explaining the structure of a coil-side yoke provided in the reaction force generating section.
Figure 6:
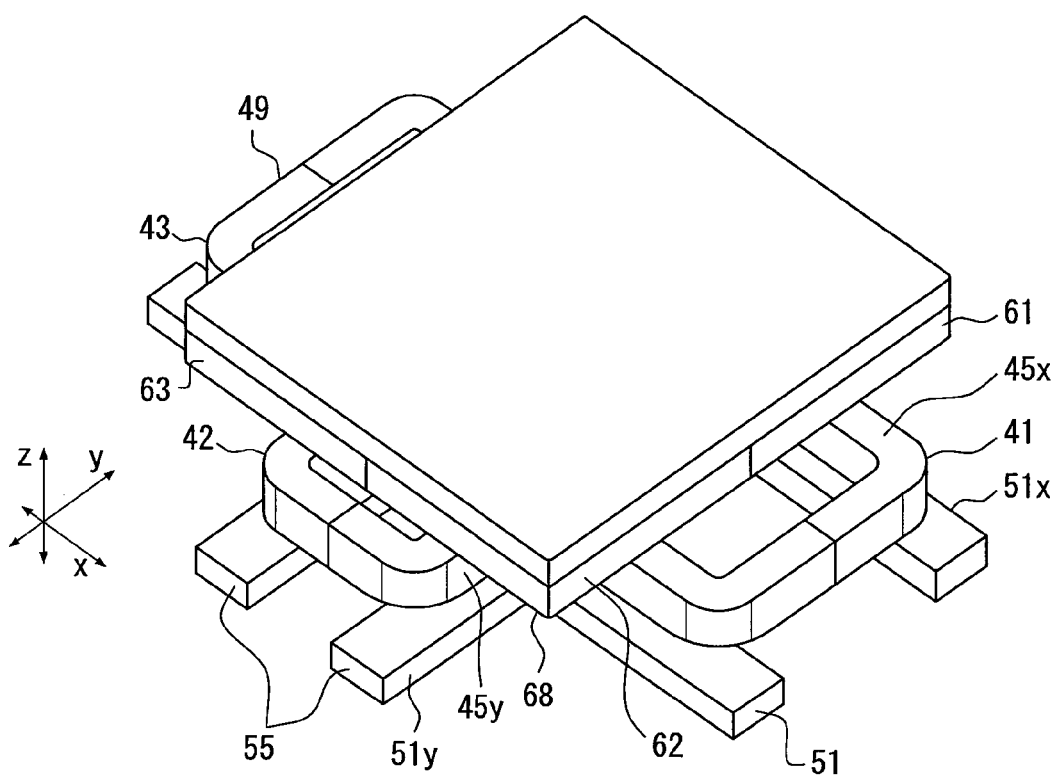
FIG. 6 is a diagram illustrating a perspective view of the reaction force generating section for explaining the structure of the coil-side yoke provided in the reaction force generating section.
Figure 9:
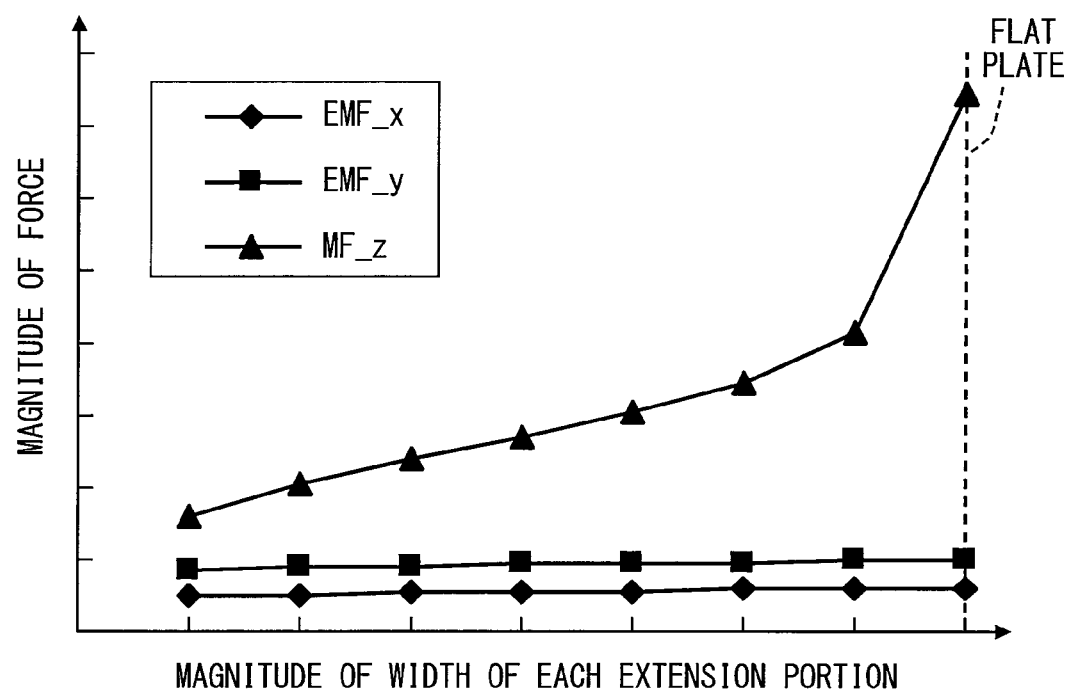
FIG. 9 is a diagram illustrating the correlation between the shape of the coil-side yoke and forces in different directions.

Next, the correlation between the shape of the coil-side yoke 51 and forces EMF_x, EMF_y, and MF_z in different directions will be further explained based on FIG. 9, referring to FIG. 5. The horizontal axis in FIG. 9 denotes the magnitude of width w of the extension portions 51x and 51y. Also, the dotted line in FIG. 9 indicates the case that the coil-side yoke becomes like a flat plate as a result of increase of width w of the extension portions 51x and 51y.

The intensities of electromagnetic forces EMF_x and EMF_y that can be generated by applying a given current or voltage to the coils 41 to 44 are maintained even when width w of the extension portions 51x and 51y is decreased. This is because the extension portions 51x and 51y of the coil-side yoke 51 concentrate the magnetic fluxes mf generated by the magnet assembly 60 on the effective winding portions 45x and 45y, thereby suppressing the decrease in the density of magnetic fluxes passing through the effective winding portions 45x and 45y.

On the other hand, as width w of the extension portions 51x and 51y is decreased, the magnetic attractive force MF_z generated between the coil-side yoke 51 and the magnet assembly 60 is reduced. This is because a portion of the coil-side yoke 51 that cannot perform the function to concentrate magnetic fluxes mf on the effective winding portions 45x and 45y is reduced and thus the number of paths through which the magnetic fluxes mf generated by the magnet assembly 60 pass is decreased.

When the functions explained so far are combined and performed, the magnetic attractive force MF_z generated between the magnet assembly 60 and the coil-side yoke 51 can be reduced while the decrease in electromagnetic forces that can be generated between the magnet assembly 60 and the coils 41 to 44 is suppressed. Thus, the friction force generated between the movable part 70 and the fixed part 50 is reduced, so the operation feeling of the operation knob 73 can be improved. In addition, the required strength of the fixed part 50 which supports the movable part 70 may be reduced, making it possible to decrease the weight of the input device 100.

In addition, in the input device 100 with a plurality of coils 41 to 44 according to the present embodiment, the area of each opposed surface 68 of the magnet assembly 60 is wide and thus the magnetic attractive force MF_z easily increases. However, when the above coil-side yoke 51 which concentrates the magnetic fluxes mf generated by the magnets 61 to 64 on the effective winding portions 45x and 45y of the individual coils 41 to 44 is adopted, the increase in magnetic attractive force MF_z can be avoided. Therefore, the coil-side yoke 51 which has a shape as mentioned above is particularly suitable for the input device 100 with a plurality of coils 41 to 44.

Furthermore, when the extension portions 51x and 51y and the opposed surfaces 68 face each other across the effective winding portions 45x and 45y as in the present embodiment, the magnetic fluxes mf emitted from the opposed surfaces 68 can surely pass through the effective winding portions 45x and 45y. In addition, when the extension portions 51x and 51y are shaped in a manner to extend along the effective winding portions 45x and 45y, it is possible to decrease the area of the coil-side yoke 51 facing the opposed surfaces 68 while increasing the overall magnetic flux density of the effective winding portions 45x and 45y. Therefore, the above structure is suitable to achieve both suppression of the decrease in electromagnetic forces EMF_x and EMF_y and reduction of magnetic attractive force MF_z.

Furthermore, when mutually adjacent extension portions 51x and 51y are connected with each other as in the present embodiment, the extension portions 51x and 51y can be fixed on the circuit board 52 securely even if the extension portions 51x and 51y are long and narrow. Therefore, even if the coil-side yoke 51 is made small in order to reduce the magnetic attractive force MF_z, the coil-side yoke 51 can be prevented from coming off the circuit board 52. In addition, since the magnetic members 55 which form the extension portions 51x and 51y are L-shaped, the portion that cannot perform the function to concentrate magnetic fluxes mf on the effective winding portions 45x and 45y can be minimized. Consequently the input device 100 can reduce the magnetic attractive force MF_z while providing high reliability.

Furthermore, in an embodiment in which the coil-side yoke 51 is mounted on the circuit board 52 as in the present embodiment, the mounting area of the circuit board 52 may be decreased due to the coil-side yoke 51. However, if the coil-side yoke 51 is small as mentioned above, it is possible to not only reduce the magnetic attractive force MF_z but also bring about the effect that the mounting area is increased. For this reason, the above structure, in which the coil-side yoke 51 is small, is particularly suitable for an embodiment in which the yoke 51 is mounted on the circuit board 52.

In the present embodiment, the coils 41 to 44 correspond to a "coil", the fixed part 50 corresponds to a "second support", and the coil-side yoke 51 corresponds to a "magnetic yoke". Also, the magnet assembly 60 corresponds to a "magnetic flux generating part", the movable part 70 corresponds to a "first support", and the operation knob 73 corresponds to an "operation part".

(Other Embodiments)

So far an embodiment according to the present disclosure has been described but the present disclosure should not be interpreted to be limited to the above embodiment and may be applied to various embodiments and combinations without departing from the gist of the present disclosure.

In Variation 1 of the above embodiment, the movable part supports four coils and a coil-side yoke. The fixed part supports a magnet assembly and a magnet-side yoke. Even in an embodiment in which the coil-side yoke is moved by input of an operation force as in Variation 1, the same effect as the above embodiment can be brought about when the yoke is small in size.

In the above embodiment, the coil-side yoke 51 has a shape following cross outlines by combination of the four L-shaped magnetic members 55 which form the extension portions 51x and 51y. However, the shape of the coil-side yoke 51 may be modified as appropriate provided that magnetic fluxes are concentrated on the effective winding portions. For example, the coil-side yoke may be made up by combining four almost quadrangular magnetic members which form the first extension portions and second extension portions. Alternatively, the first extension portions and second extension portions may be spaced from each other. As another alternative example, all the first extension portions and second extension portions may be connected with each other. As a further alternative example, the width of the first extension portions may be different from the width of the second extension portions. In addition, the width of each extension portion may be slightly smaller than the thickness of each effective winding portion. In such embodiments, magnetic attractive force MF_z can be further reduced.

Furthermore, in the coil-side yoke, the effective winding portions may be different in thickness than the other portions. Specifically, the thickness of the portions overlapping the effective winding portions in the z-axis direction is larger than the thickness of the portions overlapping the other portions. If the coil-side yoke is thus shaped, the function to concentrate magnetic fluxes mf on the effective winding portions as mentioned above can be performed.

In addition, the coil-side yoke may have a shape with projection or recess. Specifically, when its portions overlapping the effective winding portions in the z-axis direction are projected, the coil-side yoke is nearer to the effective winding portions. If the coil-side yoke is thus shaped, the function to concentrate magnetic fluxes mf on the effective winding portions as mentioned above can be performed. Also, the function to concentrate magnetic fluxes mf on the effective winding portions may be further enhanced by making the coil-side yoke have a thickness difference and also making its shape with the projection or recess as mentioned above.

In the above embodiment, the reaction force generating section uses four magnets and four coils to generate an operation reaction force. However, the number of magnets provided in the reaction force generating section, their shape, their arrangement and so on may be changed as appropriate. For example, instead of the magnet assembly 60 as a combination of magnets 61 to 64, a single magnet in which magnetic poles with N and S poles alternated are magnetized may be provided as a "magnetic flux generating part". In an embodiment which uses a plurality of magnets, the shape of individual magnets may be changed to a rectangle, etc. as appropriate. Furthermore, the sectional shape of each coil may be changed to a rectangle, etc. as appropriate.

In the above embodiment, the coil-side yoke 51 is fixed on the circuit board 52. However, the parts which support the coil-side yoke may be changed as appropriate. For example, a housing or the like may directly support the coil-side yoke. Also, each coil may be supported by a fixed member such as a circuit board, for example, through the coil-side yoke. Furthermore, each magnet may be supported directly by the knob base without the mediation of the magnet-side yoke.

In the above embodiment, the input device 100 is mounted in the vehicle in a manner that the operation plane OP defined by the operation knob 73 is oriented along the horizontal direction of the vehicle. However, the input device 100 may be mounted on the vehicle's center console, etc. with the operation plane OP inclined with respect to the horizontal direction of the vehicle.

The functions provided by the operation control section 33 and reaction force control section 37 in the above embodiment may be provided by hardware or software which is different from the above sections or a combination of these. For example, the functions may be provided by an analog circuit which performs prescribed functions without relying on a program.

The above embodiments have been described by taking an example of application of the present disclosure to the input device 100 installed on the center console as a remote control device to operate the navigation device 20. However, the present disclosure may be applied to a selector such as a shift lever installed on the center console, a steering switch installed on a steering wheel, and the like. Furthermore, the present disclosure may be applied to various vehicle functional devices located on the instrument panel, on the window side arm rest near the door, etc. and in the vicinity of the backseat. Furthermore, input devices to which the present disclosure is applied may be used not only in vehicles but also in any operation systems that are used in various transportation machines and various information terminals.

What is claimed is:

1. An input device comprising:
   four coils having windings wound around and to be supplied with current, the four coils being arranged in a cross shape;
   a magnetic flux generating part having an opposed surface facing the four coils in a direction along winding axes of the windings and being located in a manner to be movable relative to the four coils along a plane facing the four coils by electromagnetic forces generated between the magnetic flux generating part and the windings supplied with current; and a magnetic yoke being located opposite to the magnetic flux generating part across the four coils and concentrating magnetic fluxes generated by the magnetic flux generating part on portions of the windings of the four coils disposed in directions along a cross, wherein each of the coils has the winding that is wound to have four sides extending in an x-axis direction and a y-axis direction, the x-axis direction and the y-axis direction being included in the directions along the cross, the magnetic yoke includes:

first extension portions being located opposite to the opposed surface across two sides extending in the x-axis direction in the two coils arranged side by side in the x-axis direction, and extending along the two sides; and second extension portions being located opposite to the opposed surface across two sides extending in the y-axis direction in the two coils arranged side by side in the y-axis direction, and extending along the two sides.

2. The input device according to claim 1, wherein a pair of the first extension portion and the second extension portion that are most adjacent to each other are continuous with each other.

3. The input device according to claim 1, further comprising a circuit board on which the magnetic yoke is mounted.

4. The input device according to claim 1, further comprising:

a first support including an operation part to which an operation force is inputted, the first support supporting the four coils; and a second support supporting the magnetic flux generating part.

* * * * *